(12) United States Patent
Tangeland et al.

(10) Patent No.: US 9,674,453 B1
(45) Date of Patent: Jun. 6, 2017

(54) USING LOCAL TALKER POSITION TO PAN SOUND RELATIVE TO VIDEO FRAMES AT A REMOTE LOCATION

(71) Applicant: Cisco Technology, Inc., San Jose, CA (US)

(72) Inventors: Kristian Tangeland, Oslo (NO); Glenn R. G. Aarrestad, Høvik (NO); Johan Ludvig Nielsen, Oslo (NO); Øivind Stuan, Løten (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/334,892

(22) Filed: Oct. 26, 2016

(51) Int. Cl.
- H04N 7/15 (2006.01)
- H04N 5/232 (2006.01)
- H04R 1/32 (2006.01)

(52) U.S. Cl.
CPC .......... *H04N 5/23296* (2013.01); *H04N 7/15* (2013.01); *H04R 1/326* (2013.01); *H04R 2201/401* (2013.01); *H04R 2203/12* (2013.01); *H04R 2430/21* (2013.01)

(58) Field of Classification Search
None
See application file for complete search history.

(56) References Cited

U.S. PATENT DOCUMENTS

| 8,509,454 | B2 | 8/2013 | Kirkeby et al. | |
|---|---|---|---|---|
| 8,842,161 | B2 | 9/2014 | Feng et al. | |
| 9,491,405 | B2* | 11/2016 | Zhou | H04N 7/152 |
| 2010/0328419 | A1* | 12/2010 | Etter | H04N 5/607 348/14.08 |
| 2015/0221319 | A1 | 8/2015 | Cartwright et al. | |
| 2015/0271593 | A1* | 9/2015 | Sun | H04R 1/406 381/92 |
| 2015/0288824 | A1 | 10/2015 | Quiers | |

OTHER PUBLICATIONS

De Bruijn, "Application of Wave Field Synthesis in Videoconferencing," TU Delft, Delft University of Technology, Oct. 2004, 272 pages.

(Continued)

*Primary Examiner* — Creighton Smith
(74) *Attorney, Agent, or Firm* — Edell, Shapiro & Finnan, LLC

(57) ABSTRACT

At a video conference endpoint including a microphone array and a camera, different camera framings are established to frame different views of a talker based on different sets of pan, tilt, and focal length settings of the camera. Different video frames of the different views are captured using the different camera framings, respectively. A sound source direction of the talker relative to the microphone array in a fixed three-dimensional (3D) global coordinate system is determined for the different views based on sound from the talker detected by the microphone array. The sound source direction relative to the microphone array is converted to different sound source positions in planar coordinates relative to the different video frames based on the different sets of pan, tilt, and focal length settings, respectively. The different video frames, the sound, and the different sound source positions in planar coordinates are transmitted.

20 Claims, 12 Drawing Sheets

(56) References Cited

OTHER PUBLICATIONS

Eskow, "The Art of Audio Mixing for Sports," http://www.tvtechnology.com/news/0002/the-art-of-audio-mixing-for-sports/277456, Nov. 18, 2015, 3 pages.

Herre, et al., "MPEG-H Audio—The New Standard for Universal Spatial/3D Audio Coding," Journal of the Audio Engineering Society, vol. 62, No. 12, Dec. 2014, 12 pages.

* cited by examiner

USING LOCAL TALKER POSITION TO PAN SOUND RELATIVE TO VIDEO FRAMES AT A REMOTE LOCATION

TECHNICAL FIELD

The present disclosure relates to panning loudspeaker sound to match video.

BACKGROUND

A video conference session may involve a first video conference endpoint that transmits video and "mono" sound of participants engaged in a roundtable discussion to a second video conference endpoint. A participant local to the second video conference endpoint (i.e., a remote participant) may have difficulty discerning which participant local to the first videoconference endpoint is talking at any given time due to the use of the mono sound, which does not provide an indication of who is talking. Thus, the remote participant has to rely on visual clues in the transmitted video that might indicate who is talking, but which visual clues may be absent or incomplete. As a result, the remote participant does not feel fully present or immersed in the roundtable discussion.

DESCRIPTION OF EXAMPLE EMBODIMENTS

Overview

In accordance with one embodiment, a method is disclosed in which, at a video conference endpoint that includes a microphone array and a camera, different camera framings are established to frame different views of a talker based on different sets of pan, tilt, and focal length settings of the camera. Different video frames of the different views are captured using the different camera framings, respectively. A sound source direction of the talker relative to the microphone array in a fixed three-dimensional (3D) global coordinate system is determined for the different views based on sound from the talker detected by the microphone array. The sound source direction relative to the microphone array is converted to different sound source positions in planar coordinates relative to the different video frames based on the different sets of pan, tilt, and focal length settings, respectively. The different video frames, the sound, and the different sound source positions in planar coordinates are transmitted.

Example Embodiments

During a video conference session, a video conference endpoint captures audio and video of nearby participants and transmits the captured information to a remote location. Normally, the video conference endpoint will use a single camera framing at a given instant to capture video of a scene including one or more of the participants, and send the video captured with that camera framing to the remote location. However, over time, the video conference endpoint may automatically and dynamically jump between/through many different camera framings to capture overviews of the participants and best possible closeup views of different talking participants. Thus, the camera framing is prone to change at any point in time when there is a change in conference activity, such as a change of talker, movement of a talker, a rapid exchange between several talkers, and the like. Tracking these changes in conference activity results in rapid, frequent, and unexpected/unplanned or unknown changes in camera framing, in real-time. Use of simple predetermined camera framings is insufficient to handle the dynamic environment. Accordingly, embodiments presented herein accommodate/anticipate the aforementioned dynamic changes in camera framing so as to achieve correspondingly dynamic changes in panning of loudspeaker sound relative to the changes in the camera framing, as will be described below.

Figure 1:
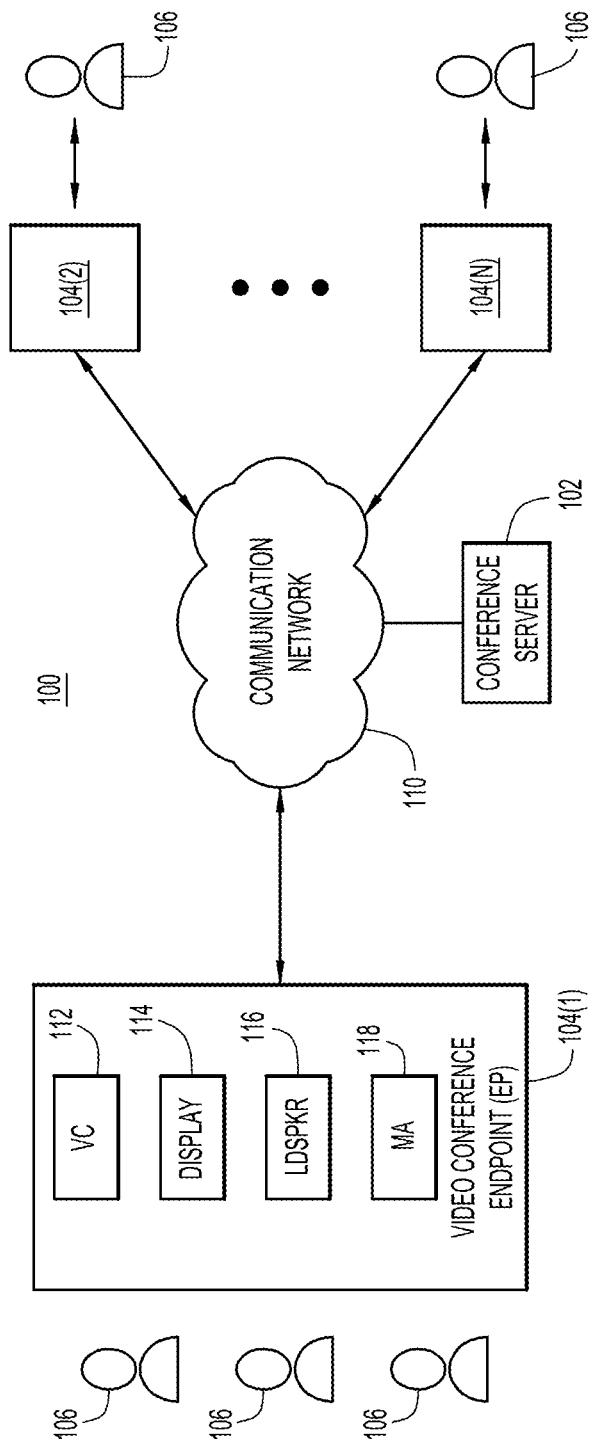
FIG. 1 is a block diagram of a video conference (e.g., teleconference) environment in which embodiments directed the use of sound source direction for loudspeaker panning relative to video may be implemented, according to an example embodiment.

With reference to FIG. 1, there is depicted a block diagram of a video conference (e.g., teleconference) environment 100 in which embodiments directed to use of position information of a talker at a video conference endpoint to pan sound at a remote video conference endpoint. Video conference environment 100 includes video conference endpoints 104(1)-104(N) (collectively "endpoints 104") operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104(i) (i.e., endpoint 104(i)) may include a video camera (VC) 112, a video display 114, loudspeakers (LDSPKRS) 116, and a microphone array (MA) 118. Each endpoint may also be coupled with an omni-directional microphone. Endpoints 104 may be wired or wireless communication devices equipped with the aforementioned components, such as, but not limited to laptop and tablet computers, smartphones, and the like. In a transmit direction, endpoints 104 capture audio/video from their local participants 106 with MA 118/VC 112, encode the captured audio/video into data packets, and transmit the data packets (with metadata described below) to other endpoints or to the conference server 102. In a receive direction, endpoints 104 decode audio/video from data packets (and the metadata) received from the conference server 102 or other endpoints, present the audio/video to their local participants 106 via loudspeakers 116/display 114, and perform loudspeaker panning based on the metadata, as will be described below.

Figure 2:
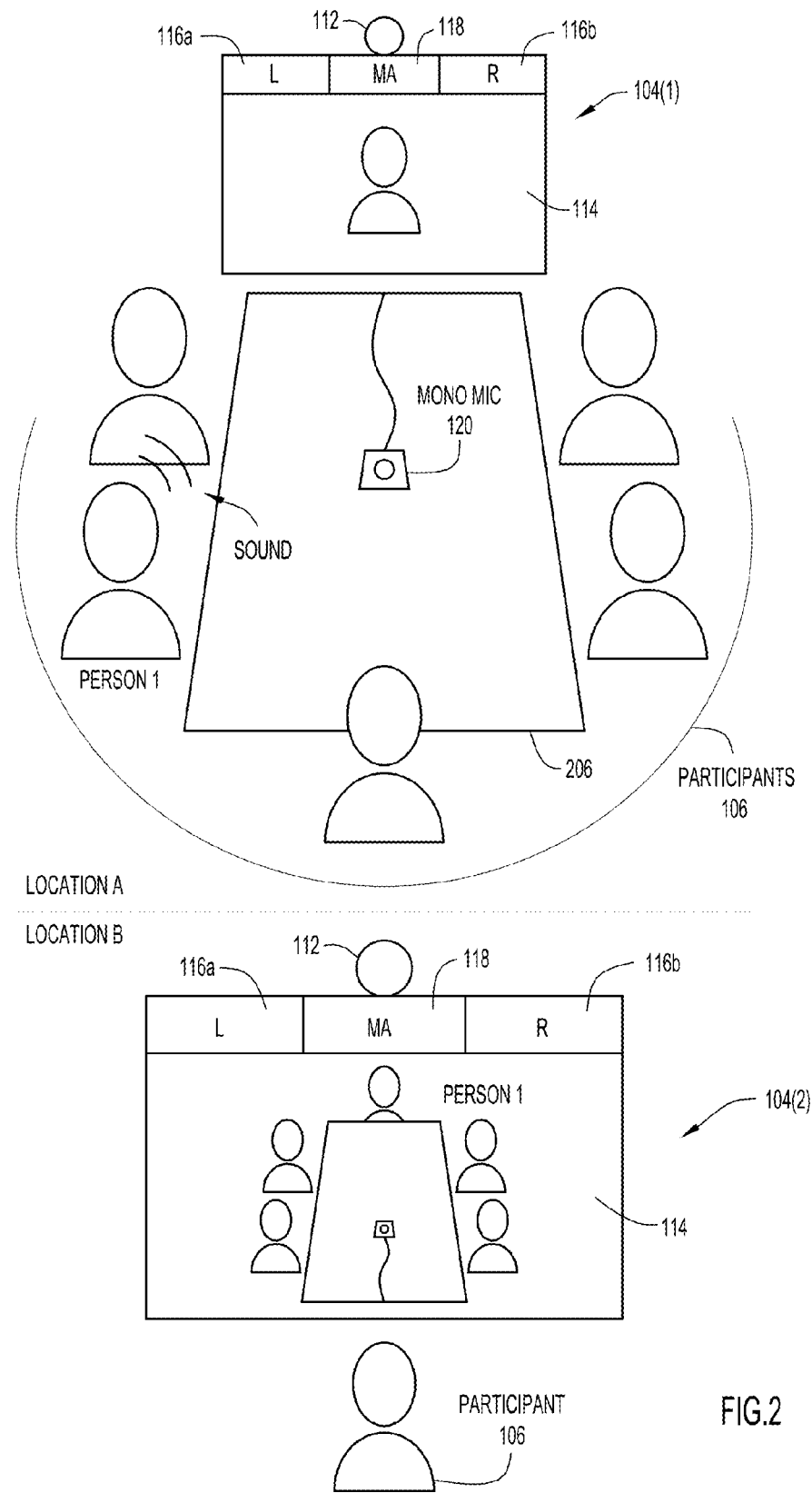
FIG. 2 is an illustration of video conference system including first and second video conference endpoints engaged in a conference session and that use sound source direction to pan loudspeaker sound relative to video, according to an example embodiment.

Referring now to FIG. 2, there is an illustration of a video conference system including video conference endpoint 104(1) deployed at a location A (top-half of FIG. 2) and video conference endpoint 104(2) deployed at a location B (bottom-half of FIG. 2) engaged in a video conference session with each other. Endpoints 104(1) and 104(2) may be deployed in respective conference rooms (not shown in FIG. 2) at their respective locations. Video conference endpoint 104(1) includes video camera 112 adjacent, and centered with respect to, a top side of display 114. Camera 112 includes pan (i.e., azimuth), tilt (i.e., elevation), and zoom (i.e., focal length or zoom-range) (PTZ) features that may be implemented mechanically and/or digitally. Endpoint 104(1) controls camera framing, i.e., PTZ settings of camera 112, to capture video of different views/scenes (i.e., to frame a view) of one or more of participants 106 seated around a table 206 opposite from or facing (i.e., in front of) the camera (and display 114), including a participant/person "person1," who is actively talking. The use of a single camera as depicted in FIG. 2 is only one example of many possible camera combinations, which may include multiple cameras, as would be appreciated by one of ordinary skill in the relevant arts having read the present description.

As depicted in the example of FIG. 2, MA 118 is also adjacent to, and centered along, the top side of display 114 so as to receive sound from participants 106. Camera 112 is centered above MA 118; however, in another embodiment, MA 118 may be centered directly behind camera 112. In addition to MA 118, endpoint 104(1) is coupled with an omni-directional microphone 120 that detects omni-directional sound and provides the sound to the endpoint. Loudspeakers 116 include a left loudspeaker (L) 116a and a right loudspeaker (R) 116b adjacent the top side of display 114 and spaced-apart from each other so as to be positioned at opposite sides of MA 118. The left and right loudspeaker arrangement is one example of many possible positional arrangements of multiple loudspeakers deployed in an array of loudspeakers.

Endpoint 104(2) at location B is configured, and operates, similarly to endpoint 104(1), and therefore the description of endpoint 104(1) shall suffice for endpoint 104(2), except where there respective operations differ in the context of sound panning as described herein. In the video conference system depicted in FIG. 2, endpoint 102(1) transmits to endpoint 102(2) video captured of the scene of participants 106 seated around table 206 and sound detected by MA 118 and omni-directional microphone 120 from the participants, e.g., primarily from person1. Endpoint 102(2) presents the video and sound received from endpoint 102(1), as shown in FIG. 1. Similarly, endpoint 102(2) transmits to endpoint 102(1) video captured of the single participant at location B and sound detected from that participant, if any. Endpoint 102(1) presents the video and sound received from endpoint 102(2), as shown in FIG. 2.

According to embodiments described herein, endpoint 104(1) converts a position of a sound source (e.g., a talker) determined based on audio detected by MA 118 to metadata that indicates the position of the sound source in/relative to an image/video frame of a view of the sound source (e.g., the talker) captured by camera 112. Endpoint 104(1) transmits to endpoint 104(2) the audio (as standard mono or multi-channel formats) and video streams, along with the metadata. Endpoint 104(2) uses the metadata to route or pan the sound across left and right loudspeakers of that endpoint to match the position of the sound source relative to the displayed video, either when displayed full frame or when used in a compound layout.

The following definitions are helpful in describing the embodiments which rely on the definitions:

a. Microphone coordinate system. A three-dimensional (3D) polar coordinate system having an origin that coincides with a center of a front plane of microphone array 118, with a range axis pointing away from the microphone array (e.g., into the room in which the microphone array is deployed). Position coordinates ($\phi$—azimuth angle, $\theta$—elevation angle, r—range/distance) in the microphone coordinate system are relative to a position of the microphone array.

b. Global coordinate system. A 3D polar coordinate system that coincides with the microphone coordinate system. Position coordinates ($\phi$, $\theta$, r) in the global coordinate system (i.e., global coordinates) are also relative to a position of the microphone array because the two coordinate systems coincide.

c. Camera coordinate system. A 3D polar coordinate system having an origin in a center of an image sensor of the camera. The camera coordinate system rotates with elevation and azimuth positions/settings of the camera. Position coordinates ($\phi$, $\theta$, r) in the camera coordinate system (i.e., camera coordinates) are relative to a position of the camera.

d. Sensor coordinate system. A 2D or planar coordinate system having an origin in a center of a planar face of the image sensor. Position coordinates (x, y) in the sensor coordinate system (i.e., x, y sensor coordinates) are relative to the sensor and the position of the camera.

e. Sound source position in planar coordinates (x, y) (also referred to as "sound source coordinates (x, y)" and "sound source offsets [x, y]"). A sound source position in planar coordinates is relative to an image/video frame (and thus camera framing) having an origin that coincides with a center of the image/video frame captured at a local endpoint, transmitted to a remote endpoint, and displayed at the remote endpoint. The sound source position in planar coordinates is the position of the sound source in or projected onto the image/video frame. The sound source position in planar coordinates may be normalized to a full width (1.0) and a full height (1.0) of the image/video frame, i.e., sound source coordinates x, y are each normalized to a range of 0 to +/−0.5, where 0 corresponds to a center of the image/video frame and the +/−0.5 corresponds to an edge of the image/video frame in correspondence with the normalized full width and height of the image.

Figure 3:
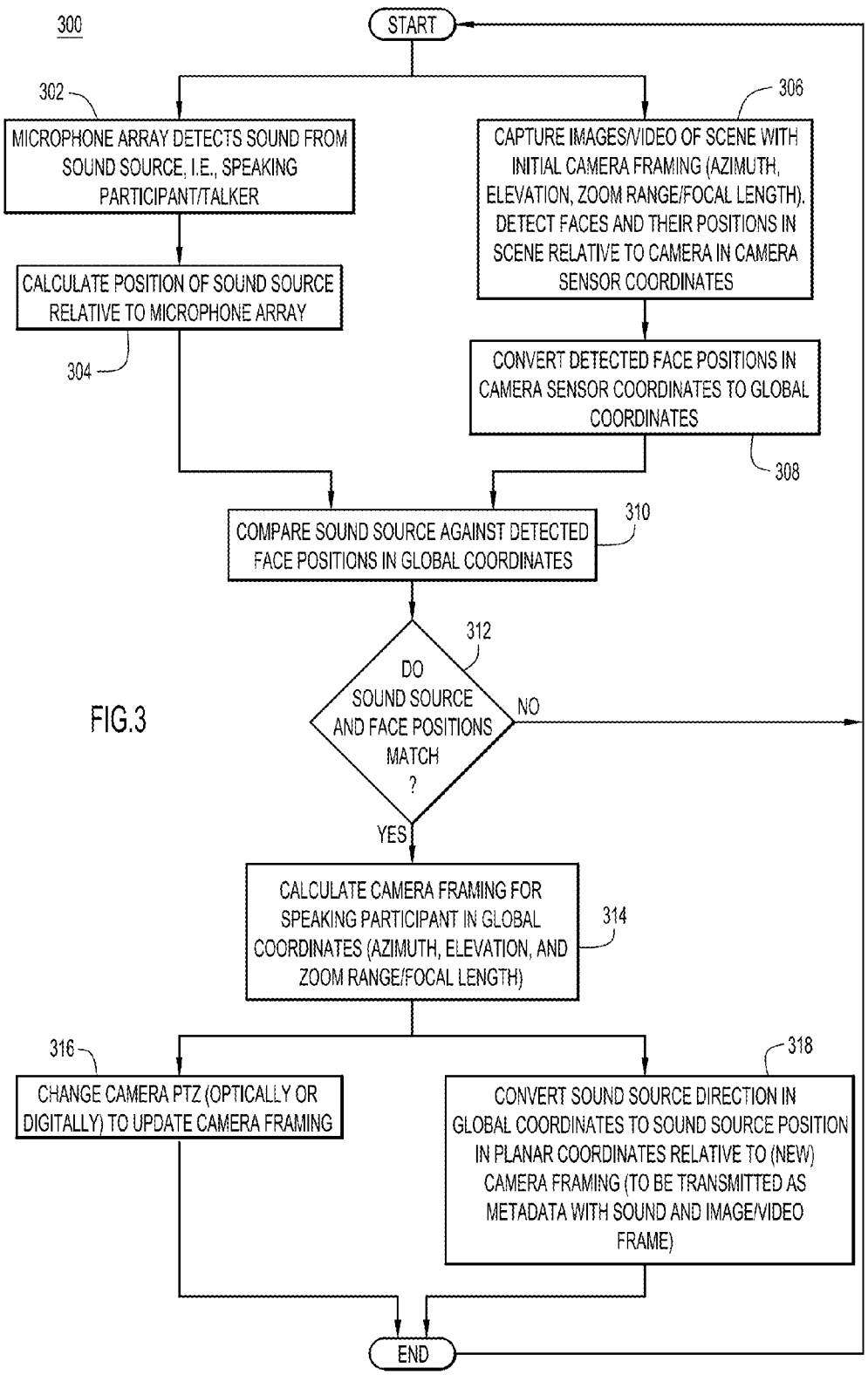
FIG. 3 is a flowchart of an example method of using sound source direction to pan loudspeaker sound relative to an image/video frame in the video conference system of FIG. 2, according to an example embodiment.

With reference to FIG. 3, there is a flowchart of an example method 300 of using sound direction to pan loudspeaker sound relative to an image/video frame. Method 300 is described with reference to the conference system of FIG. 2 by way of example, only. Method 300 may be performed by/at each of endpoints 104. FIG. 3 will be described also with reference to FIGS. 4 and 5.

Initially, flow proceeds in parallel from a start of method 300 to first operations 302, 304 and second operations 306, 308, which are executed in parallel. From the first and second operations, flow proceeds to operations 310 and 312 in sequence. Collectively, operations 302 to 312 determine a presence of a talker and a position of the talker with a relatively high level of confidence.

Also, although not explicitly shown in method 300, endpoints 104(1) and 104(2) transmit to each other their respectively captured image/video frames and detected sound (as described above) in video streams and sound streams, e.g., in Real-time Transport (RTP) streams, while the operations that are explicitly shown in FIG. 3 are performed.

At 302, endpoint 104(1) (i.e., microphone array 118) detects sound from a talker, e.g., person1.

At 304, endpoint 104(1) determines a position of the talker (referred to as a sound source position) relative to microphone array 118 based on the detected sound. In other words, endpoint 104(1) determines sound source position coordinates in the microphone coordinate system. The sound source position includes a sound direction from which microphone array 118 receives the sound (from person1), as well as a range/distance from the microphone array to person1. The sound direction (referred to as a "sound source direction") may be represented as azimuth and elevation angles between a direction from which the sound is received from the sound source at microphone array 118 and a normal extending from the origin of the microphone array.

At 306, endpoint 104(1) establishes an initial camera framing to capture and frame an initial view/scene including the talker based on initial PTZ settings of the camera. The initial camera framing may correspond to a wide-angle or zoomed-out view (also referred to as an "overview") that encompasses all of participants 106 seated around table 206 at location A, for example. In an example, over time, an example overview may represent a view centered on the group of participants 106 (identified by their detected faces) seated around table 206 and in which the degree of zoom establishes an outer boundary around the group. The outer boundary is fitted relatively tightly to the group but allows room to show, e.g., the face and an upper body of each of the participants with extra margin to accommodate participant movement. Endpoint 104(1) may adjust the outer boundary dynamically to account for movement, and when new faces are detected (see next step 308) or when previously detected faces become undetectable.

At 308, endpoint 104(1) (i.e., camera 112) captures images/video frames of the view based on the initial camera framing, and transmits the images/video frames to endpoint 104(2). Endpoint 104(1) detects faces and positions thereof in the captured images/video frames. To do this, endpoint 104(1) may process the captured images/video frames with a face detection algorithm that detects the faces and outputs a face position relative to the image sensor of camera 112 (i.e., in x, y sensor coordinates).

At 310, endpoint 104(1) converts each face position relative to the image sensor (i.e., in x, y sensor coordinates) to a face position relative to the global coordinate system (i.e., in global coordinates).

At 312, endpoint 104(1) determines whether any face positions in global coordinates coincide with or match any sound source positions in global coordinates within a predetermined positional tolerance, i.e., whether a face position coincides with a sound source position for a talker. The match may be based on a comparison between each sound direction of a sound source (i.e., each sound source direction) and each face direction (i.e., the direction a face that is detected subtends at the image sensor relative to the camera coordinate system). If there are no matches, flow returns to the start point. Otherwise, if there is a match, indicating that a talker is present with a relatively high level of confidence, and flow proceeds to 314.

Figure 4:
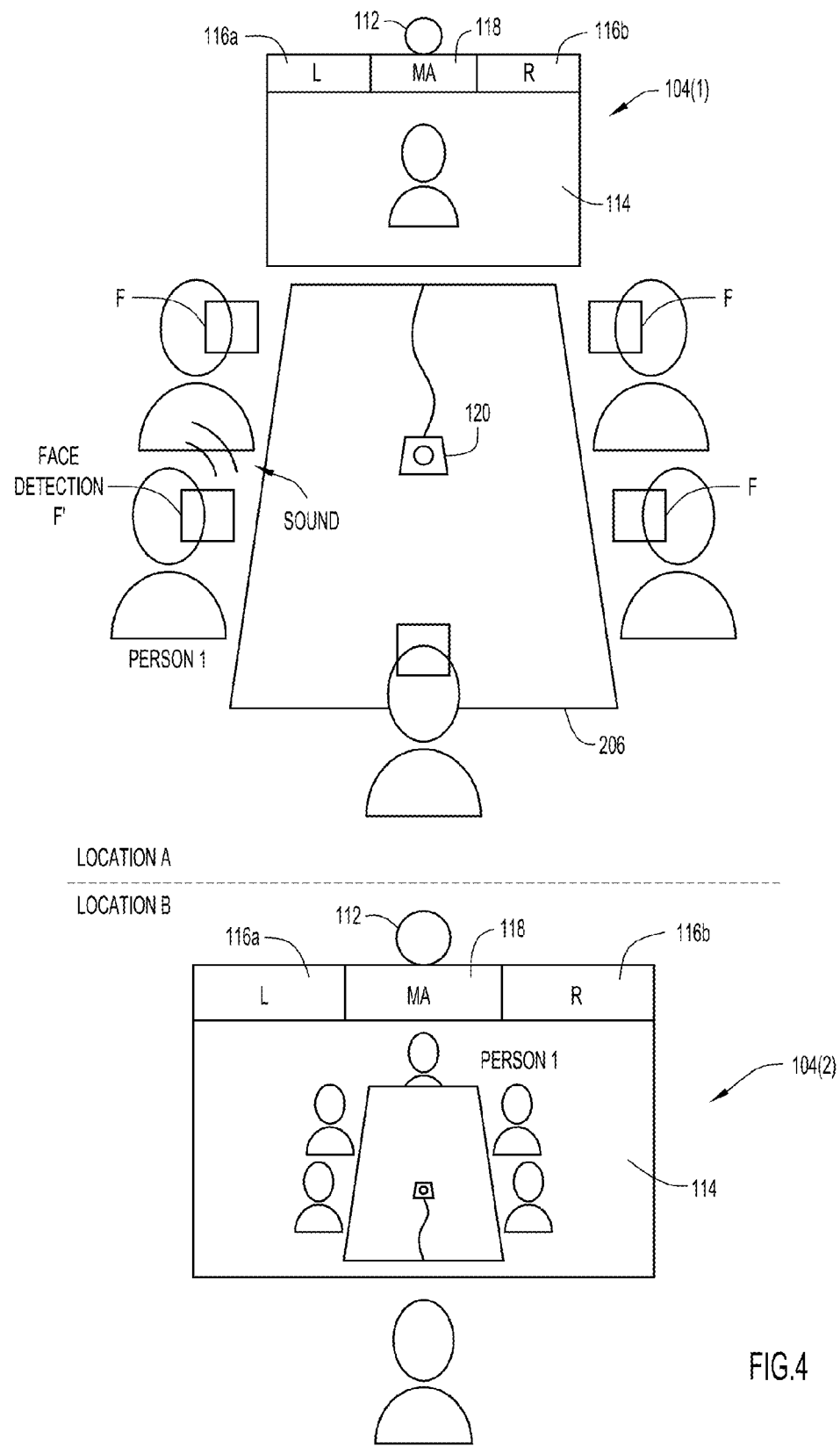
FIG. 4 is an illustration of the video conference system of FIG. 2 showing detected faces of conference participants, according to an example embodiment.

With reference to FIG. 4, there is an illustration of the video conference system of FIG. 2 showing faces detected at operations 306/308 as face position confidence boxes F projected onto and that coincide with corresponding ones of participants 106 and a face position confidence box F' for person1 that coincides with the sound source position determined at 304, indicating that person1 is a talker. From the viewpoint of camera 112 using the initial camera framing of operation 306, person1 is seen as positioned at the right-hand-side of table 206 and thus on the right-hand-side of the image/video frames captured by camera 112. As a result, endpoint 104(2) displays the image/video frames transmitted by and received from endpoint 104(1) such that person1 is depicted at the right-hand-side of the image/video frames. In addition, endpoint 104(2) may playback sound received from endpoint 104(1) such that the sound is balanced across the left and right loudspeakers or, alternatively, primarily from the right loudspeaker, depending on whether the sound source position detected at endpoint 104(1) is, or is not, used to pan sound at endpoint 104(1) according to embodiments presented herein, respectively.

Returning to FIG. 3, at 314, endpoint 104(1) determines a new camera framing to capture and frame a new view including the talker based on new pan, tilt, and focal length settings of the camera. The new camera framing may correspond to a narrow-angle or zoomed-in view (i.e., a closeup view) of the talker, e.g., person1. An example of a closeup view of the talker is a view that is focused primarily on the talker, e.g., person1. The closeup view has an outer boundary fitted relatively tightly to the talker but allows room to show, e.g., the face and an upper body of the talker with extra margin to accommodate participant movement. To achieve the closeup view, endpoint 104(1) may control camera 112 with a closeup camera zoom factor that is based on a distance from the camera to the talker.

From 314, flow proceeds to operations 316 and 318 in parallel.

At 316, endpoint 104(1) establishes the new camera framing by changing the initial PTZ settings to the new PTZ settings, and captures image/video frames of the new view based on the new camera framing. Endpoint 104(1) transmits the image/video frames to endpoint 104(2).

At 318, endpoint 104(1) converts the sound source position (e.g., sound direction) relative to the global coordinate system to a sound source position in planar coordinates relative to the camera framing, i.e., relative to the image/video frames. The sound source position in planar coordinates represents the sound source position (determined based on detected sound) as projected onto the image/video frames. Also, endpoint 104(1) transmits to endpoint 104(2)

the sound source position in planar coordinates as metadata embedded in the transmitted sound stream. Thus, endpoint 104(1) transmits contemporaneously captured image/video frames, detected audio, and calculated sound source position in planar coordinates. That is, endpoint 104(1) transmits sound associated with the image/video frames, and the calculated sound source position in planar coordinates that is associated with the sound.

Assuming that the talker is relatively stationary, the sound source direction of the talker relative to microphone array 118 and the global coordinate system does not change, i.e., is fixed, regardless of whether the camera framing is fixed or changes. For example, the sound source direction of the talker relative to microphone array 118 is fixed as the camera framing changes from the wide-view to the closeup view. In contrast, the sound source position in planar coordinates (i.e., relative to the camera framing or image/video frames) generally changes in correspondence with changes in the camera framing. Capturing this change is important for appropriate loudspeaker panning relative to the video at location B, as discussed below.

At location B, endpoint 104(2) receives the image/video frames, the sound (including, but not limited to, the mono sound), and the sound source position in planar coordinates transmitted by endpoint 104(1). Endpoint 104(2) displays the image/video frames and uses the sound source position in planar coordinates to pan the mono sound as played-back from the left and/or right loudspeakers at endpoint 104(2) as appropriate so that the played-back sound correlates with the position of person1 in the image/video frames displayed on display 114 at endpoint 104(2). For example, if the position of person1 is on the right-hand-side of the displayed image/video frame, sound corresponding to person1 is played-back primarily from the right loudspeaker, and vice versa.

Figure 5:
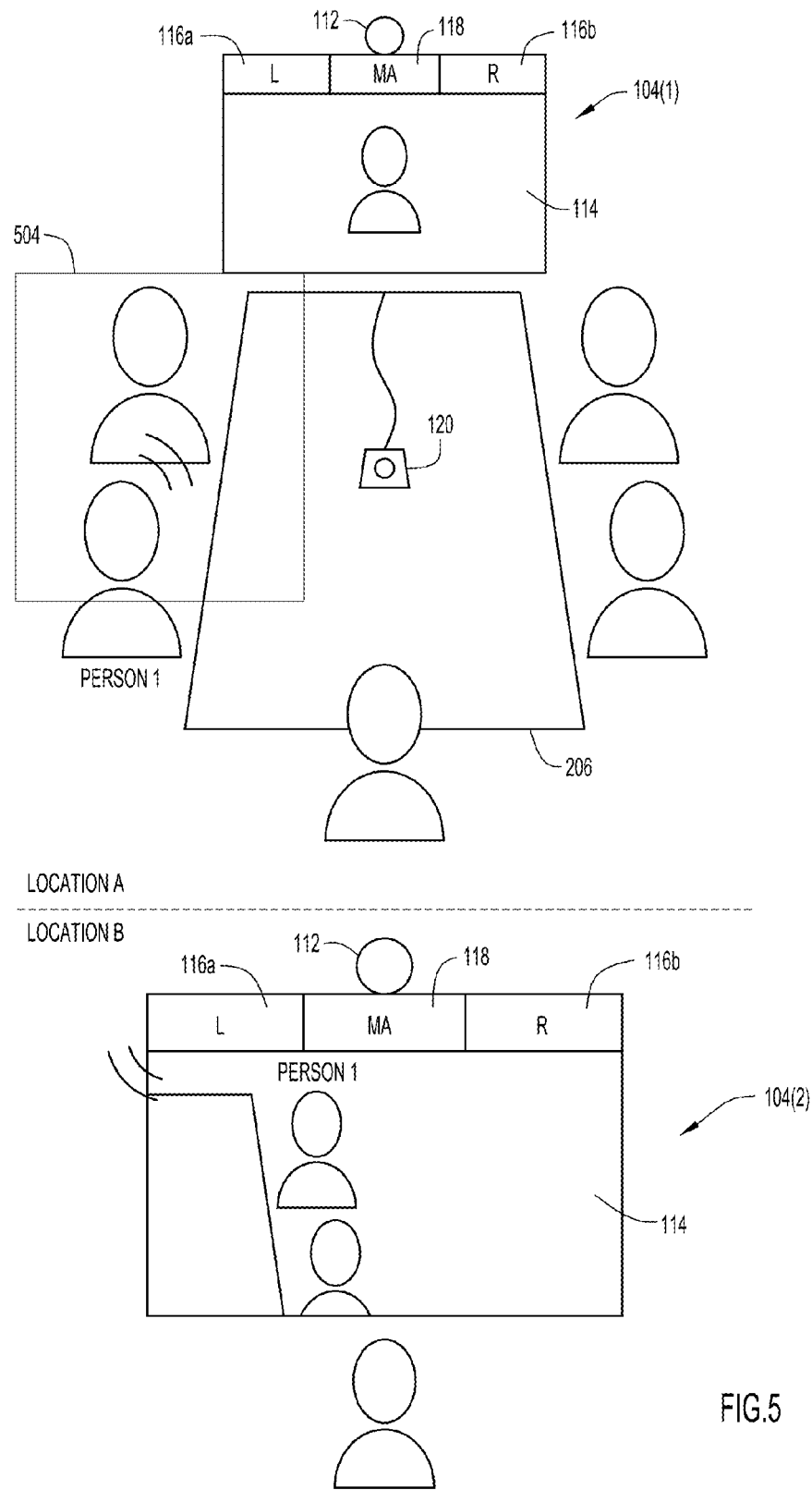
FIG. 5 is an illustration of the video conference system of FIG. 2 using sound source position in planar coordinates determined at the first video conference endpoint to pan loudspeaker sound relative to video at the second video conference endpoint, according to an example embodiment.

With reference to FIG. 5, there is an illustration of the video conference system of FIG. 2 corresponding to the new camera framing established at operation 314 and using the sound source position in planar coordinates from operation 318 to pan loudspeaker sound at location B relative to the closeup view. The new camera framing captures/frames a zoomed-in view 504 of person1, which is transmitted to and displayed at endpoint 104(2), as shown in FIG. 5. Transitioning from the initial framing (zoomed-out view) to the new framing (zoomed-in view 504) causes person1 to shift positionally from the right-hand-side of the captured image/video frames to the left-hand-side of the captured image/video frames from the perspective of camera 112 at endpoint 104(1), and thus as displayed at endpoint 104(2). Additionally, endpoint 104(2) uses the sound source position in planar coordinates received from endpoint 104(1) to pan (mono) sound received from endpoint 104(1) to the left loudspeaker at endpoint 104(2) contemporaneously with the playback of the sound and video received from endpoint 104(1).

Method 300 repeats over time. So, as endpoint 104(1) adjusts the camera framing to capture different views of one or more talkers, the endpoint calculates new sound source positions in planar coordinates corresponding to the adjusted camera framing, even if the sound source position relative to microphone array 118 remains constant or fixed. Endpoint 104(2) uses the new sound source positions in planar coordinates to pan sound relative to the adjusted camera framing so that the left and right loudspeaker sound correlates with the image/video frames that are contemporaneous with the sound.

In the embodiment of method 300 described above, a sound source position in planar coordinates is not calculated for the initial (overview) camera framing; however, in an alternative embodiment, such a sound source position in planar coordinates is calculated for the initial camera framing using the conversions described in operation 318, transmitted to endpoint 104(2), and used for panning at that endpoint.

The above-mentioned calculations/conversions performed at operations 308 and 318 are now described in detail. At operation 308, endpoint 104(1) converts a face position in sensor coordinates to a face position in global coordinates as follows.

Assume the following known variables:

face_$x_{SensorCoordinates}$ (i.e., x coordinate of a detected face as imaged on the image sensor);

face_$y_{SensorCoordinates}$ (i.e., y coordinate of a detected face as imaged on the image sensor); and face_distance—Calculated based on a face detection size in sensor coordinates, relative to focalLength (zoom), where focalLength (zoom) is the focal length setting of the camera. The face_distance is the distance of the actual face that is detected from the image sensor.

First, endpoint 104(1) converts the face position in sensor coordinates to a face position in camera coordinates as follows:

face_$\phi_{CameraCoordinates}$=a tan((face_x/resolution_x)*(sensorWidth/focalLength));

face_$\theta_{CameraCoordinates}$=a tan((face_y/resolution_y)*(sensorHeight/focalLength)); and face_$r_{CameraCoordinates}$=face_distance, where sensorWidth, sensorHeight are x, y planar dimensions of the image sensor, and resolution_x, resolution_y are height, width pixel resolutions of the image sensor.

Next, endpoint 104(1) converts the face position in camera coordinates to the face position in global coordinates, as follows:

face_$\phi_{GlobalCoordinates}$=face_$\phi_{CameraCoordinates}$+camera_pan;

face_$\theta_{GlobalCoordinates}$=face_$\theta_{CameraCoordinates}$+camera_tilt; and face_$r_{GlobalCoordinates}$=face_$r_{CameraCoordinates}$, where camera_pan, camera_tilt are pan (azimuth), tilt (elevation) settings of the camera.

At operation 318, endpoint 104(1) converts the sound source position in global coordinates (i.e., relative to the global coordinate system, which is the same as the microphone coordinate system) to the sound source position in planar coordinates relative to the image/video frames, i.e., relative to the camera framing, as follows:

The following global coordinates of the sound source direction are known from operation 304:

sound_$\phi_{GlobalCoordinates}$; and sound_$\theta_{GlobalCoordinates}$.

First, endpoint 102(1) converts the sound source direction in global coordinates to a sound source position in camera coordinates (i.e., relative to the camera coordinate system), as follows:

sound_$\phi_{CameraCoordinates}$=sound_$\phi_{GlobalCoordinates}$−camera_pan_for_updated_framing; and sound_$\theta_{CameraCoordinates}$=sound_$\theta_{GlobalCoordinates}$−camera_tilt_for_updated_framing, where camera_pan_for_updated_framing=pan setting, and camera_tilt_for_updated_framing=tilt setting.

Next, endpoint 102(1) converts the sound source position in camera coordinates to the sound source position in planar coordinates, i.e., relative to the camera framing or image/camera frames:

sound_x=resolution_x*focalLength*tan(sound_$\phi_{CameraCoordinates}$)/sensorWidth;

sound_y=resolution_y*focalLength*tan(sound_$\theta_{CameraCoordinates}$) sensorHeight;

sound_$x_{normalized}$=sound_x/resolution_x; and sound_$y_{normalized}$=sound_y/resolution_y, where sound_$X_{normalized}$, sound_$y_{normalized}$ represent the sound source position in planar coordinates that are normalized, and specifically, represent normalized x, y (sound position) offsets from a center of the image/video frames, where the offsets range from 0 to −0.5 on the left-hand-side of the image/video frames and 0 to +0.5 on the right-hand-side of the image/video frames. Thus, sound_$x_{normalized}$ and sound_$y_{normalized}$ represent respective fractions of a normalized full width (1.0) and a normalized full height (1.0) of the image sensor, respectively. Sound_$x_{normalized}$ and sound_$y_{normalized}$ are also referred to as "sound offset coordinates [x, y]."

Figure 6:
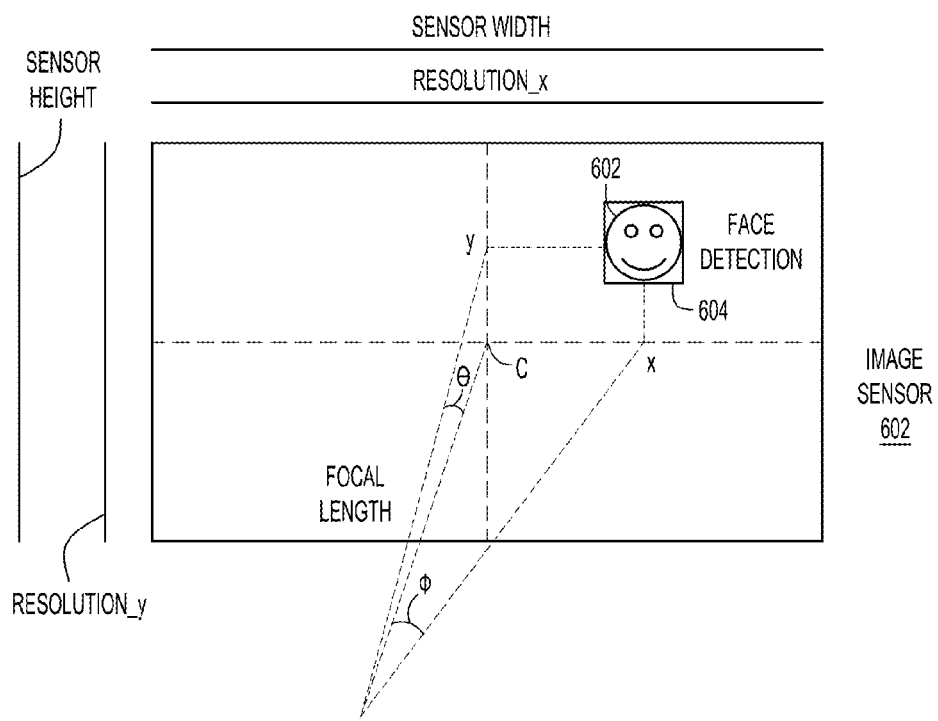
FIG. 6 is an illustration of an image sensor of a camera of a video conference endpoint, according to an example embodiment.
Figure 7:
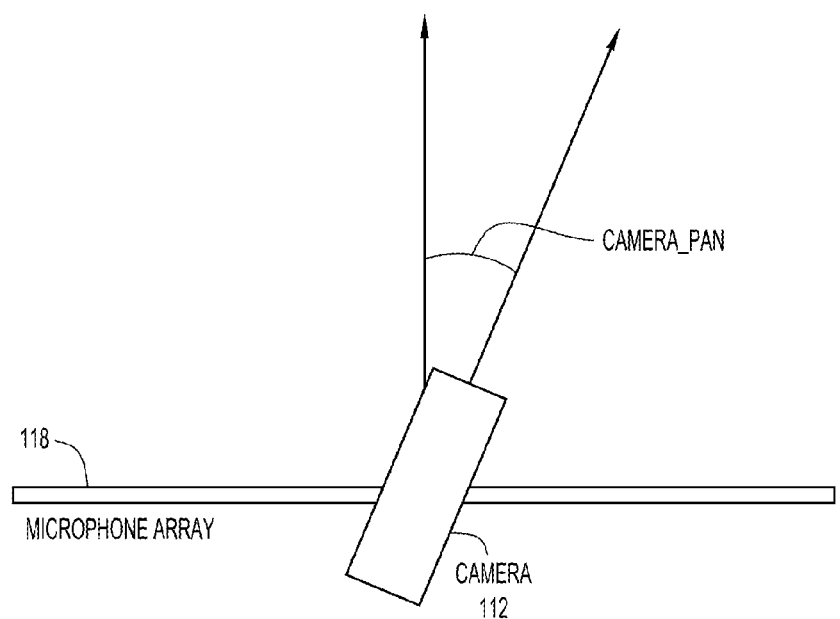
FIG. 7 is an illustration of a top-down view of the camera and a microphone array of the video conference endpoint, according to an example embodiment.

With reference to FIGS. 6 and 7, there are illustrations of various camera-related elements and quantities/variables used in the above-described conversions.

FIG. 6 is an illustration of an image sensor 602 of camera 112 that has respective width and height dimensions equal to sensorWidth and sensorHeight, and respective x and y pixel resolutions equal to resolution_x and resolution_y, respectively. With camera 112 looking into a room, a face of a person in the room is imaged onto a planar face of image sensor as object 604, where object 604 represents the imaged face. A square 605 coinciding with imaged face 604 indicates that the imaged face is a detected face. A distance of the actual face from image sensor 602 may be determined based on how large the face appears as imaged on the image sensor, e.g., face distance=average_face_size*focalLength/imaged_face_size (i.e., size_on_sensor). Imaged face 604 has a center position x, y on image sensor 602 represented in pixel coordinates. For example, if image sensor 602 has a pixel resolution of 1080×1920 pixels, the position x, y of imaged face 604 may be x, y=200, 200, i.e., 200 pixels to the left of a center C of image sensor 602 and 200 pixels upwards from the center. Given the pixel position on image sensor 602, the dimensions of the image sensor, and the focal length, then an azimuth angle $\phi$ and an elevation angle $\theta$ of the face in the room relative to camera 114 can be calculated.

With reference to FIG. 7, there is an illustration of a top-down view of camera 112 and microphone array 118, in which the camera is panned to the right by an angle camera_pan.

Endpoint 104(2) uses the sound source position in planar coordinates (i.e., "sound offset coordinates [x, y]") received from endpoint 104(1) to pan sound across the left and right loudspeakers of endpoint 104(2) such that the sound correlates with the video from endpoint 104(1) that is displayed at endpoint 104(2). To do this, endpoint 104(2) mixes the sound received from endpoint 104(1), which may be mono sound, based on the sound offset coordinates [x, y] received from endpoint 104(1). For example, using a two-channel loudspeaker mixing/panning equation, which converts the mono sound to 2-channel sound endpoint, 104(2) may mix the sound using the following left and right loudspeaker gain equations:

LeftGain=0.5*(1.0+cos(*PI**(0.5+*x*))); and

RightGain=1.0−LeftGain, where *x*=sound_$x_{normalized}$.

In other embodiments, the left and right gain equations may use both [x, y] offsets.

Further examples of loudspeaker panning using method 300 and variations thereof in the system of FIG. 2 during the conference session are now described with reference to FIGS. 8-10.

Figure 8:
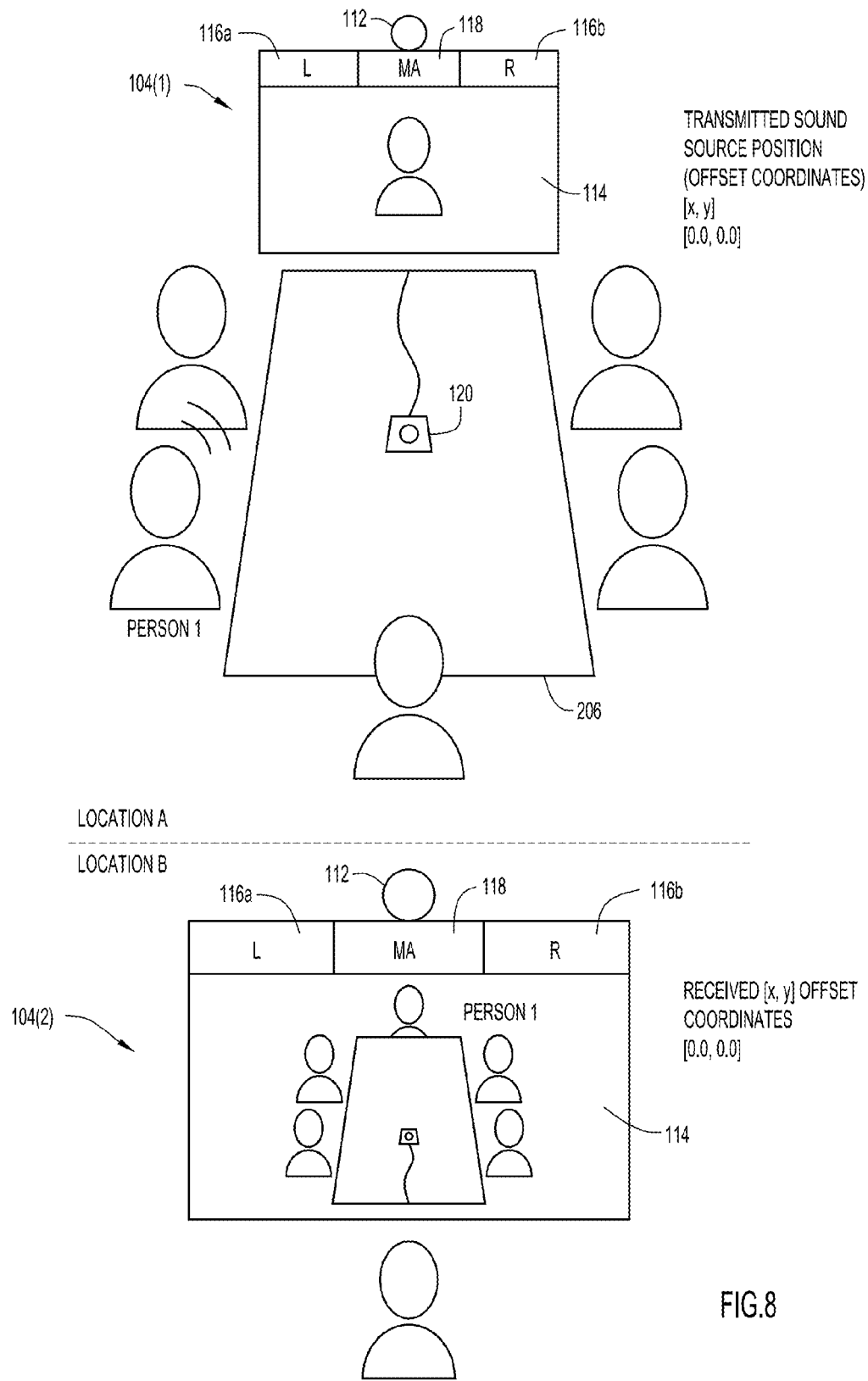
FIG. 8 is an illustration of the video conference system of FIG. 2 using wide-view camera framing, in which conference the system does not use sound source direction to pan loudspeaker sound relative to video, according to an example embodiment.

With reference to FIG. 8, there in an illustration of the system of FIG. 2 in wide-view similar to that shown in FIG. 4, in which the system does not use sound source direction to pan sound at endpoint 104(2). At location A, endpoint 104(1) sets camera framing to capture the wide-view of the local participants, but does not translate the sound source direction determined for person1 at operation 304 to corresponding sound offset coordinates [x, y]. Instead, endpoint 104(1) sets the sound offset coordinates [x, y] to initial, default values [0, 0] representing a centered sound direction (i.e., centered sound source) relative to camera framing (i.e., relative to the image/video frames). Endpoint 104(2) receives the default sound offset coordinates [x, y] from endpoint 104(1) and uses them to perform default/centered sound mixing to pan the playback sound for the centered sound source according to the 2-channel loudspeaker mixing equations, with x=0 and discarding y, as follows:

LeftGain=0.5*(1.0+cos(*PI**(0.5+*x*)))=0.5; and

RightGain=1.0−LeftGain=0.5.

Figure 9:
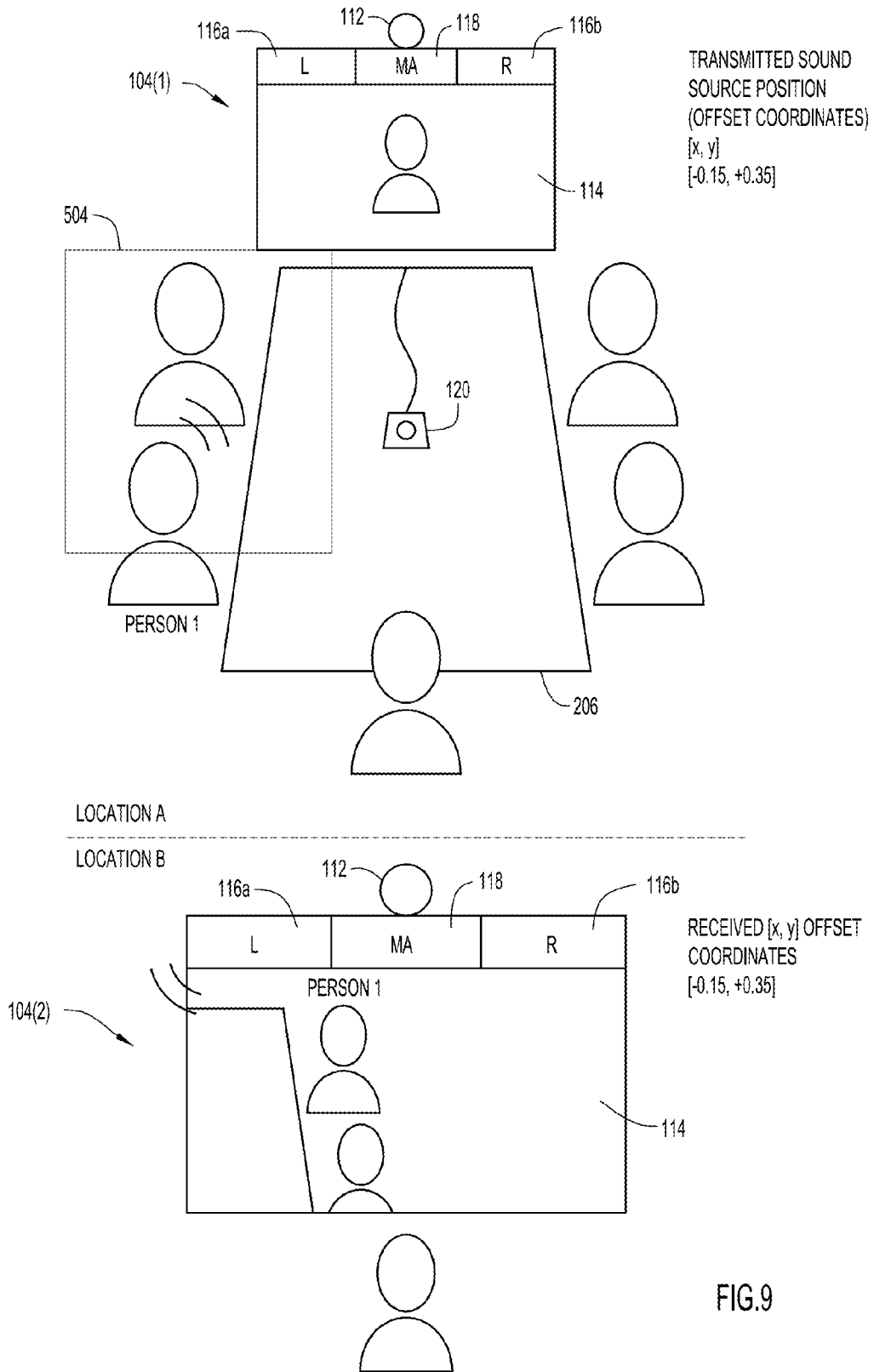
FIG. 9 is an illustration of the video conference system of FIG. 2 using closeup camera framing, in which the system uses sound source direction to pan loudspeaker sound relative to video, according to an example embodiment.

With reference to FIG. 9, there in an illustration of the system of FIG. 2 in closeup view similar to that shown in FIG. 5, i.e., using sound source direction to pan loudspeaker sound at endpoint 104(2). At location A, endpoint 104(1) sets camera framing to capture the zoomed-in view 504 of person1 at operation 316, and at operation 318 translates the sound source direction determined for person1 at operation 304 to corresponding sound offset coordinates [x, y]=[−0.15, +0.35], because the current sound source, person1, is located just to the left of the vertical center line in the image/video frames and close to the top edge thereof At location B, endpoint 104(2) receives the sound offset coordinates [−0.15, +0.35] and uses them to perform loudspeaker sound mixing to pan the playback sound for the offset sound source, to correlate with the position of person1 in the played-back image/video frames, according to the 2-channel loudspeaker mixing/panning equations, with x=−0.15 and discarding y, as follows:

LeftGain=0.5*(1.0+cos(*PI**(0.5+*x*)))=0.727; and

RightGain=1.0−LeftGain=0.273.

Figure 10:
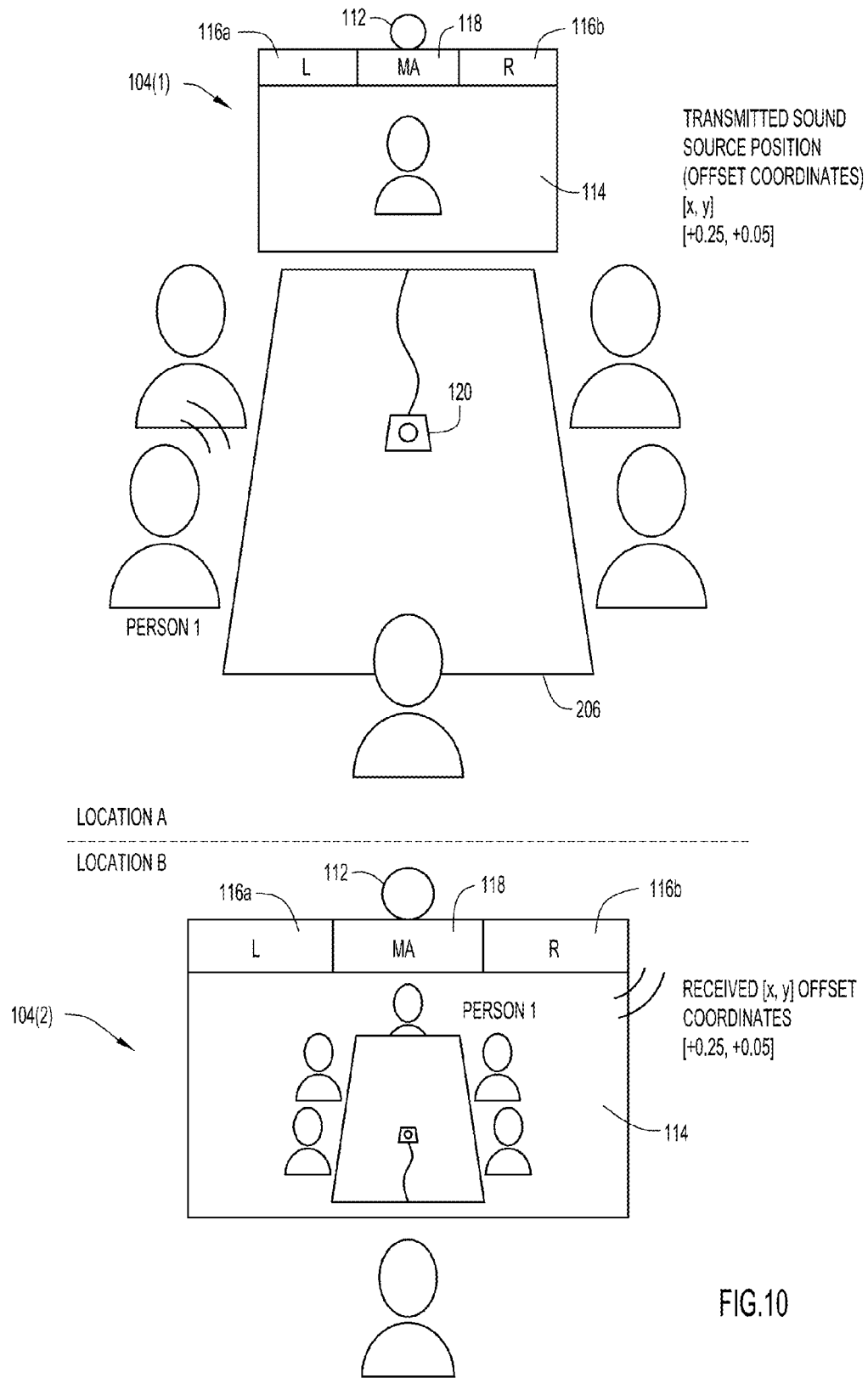
FIG. 10 is an illustration of the system of FIG. 2 using wide-view camera framing, in which the system uses sound source direction to pan loudspeaker sound relative to video, according to an example embodiment.

With reference to FIG. 10, there in an illustration of the system of FIG. 2 in wide-view similar to that shown in FIG. 4, but in which the system uses sound source position in planar coordinates to pan sound at endpoint 104(2). At location A, endpoint 104(1) sets camera framing to capture the wide-view of the local participants, and translates the sound source direction determined for person1 to corresponding sound offset coordinates [x, y]=[+0.25, +0.25], because the current sound source, person1, is located just above the horizontal centerline and between the vertical centerline and the right edge of the image/video frames.

Endpoint 104(2) receives the sound offset coordinates [+0.25, +0.25] transmitted from endpoint 104(1) and uses them to perform sound mixing to pan the playback sound to correlate with the position of person1 in the played-back image/video frames according to the 2-channel loudspeaker mixing/panning equations, with x=+0.25 and discarding y, as follows:

LeftGain=0.5*(1.0+cos(*PI**(0.5+*x*)))=0.146; and

RightGain=1.0−LeftGain=0.854.

As mentioned above, endpoint 104(1) may transmit RTP audio and video streams. In that case, endpoint 104(1) may embed the sound source position in planar coordinates (i.e., sound offset coordinates [x, y]) in the RTP audio stream, e.g., using RTP header extensions. By embedding the metadata in the RTP audio stream, a change in the sound source position in planar coordinates caused by a change in an actual position of the sound source or by a change in the camera framing are immediately signaled to endpoint 104(2) via the metadata in the RTP stream. The metadata may be carried in an RTP header extension element in accordance with the "A General Mechanism for RTP Header Extensions" of the RFC5285 IETF standard. Other formats are possible.

Figure 11:
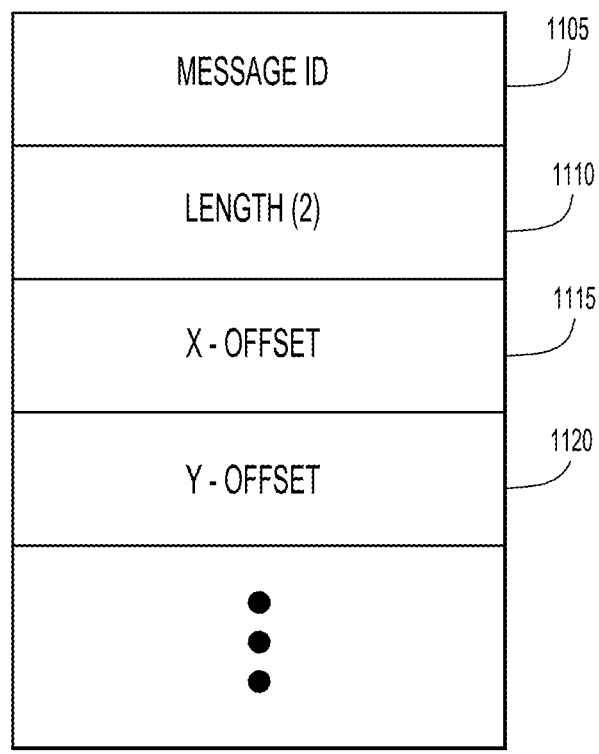
FIG. 11 is an illustration of a message for carrying sound source positions in planar coordinates as metadata for use in sound panning, according to an example embodiment.

With reference to FIG. 11, there is an illustration of an example message 1100 for carrying sound source positions in planar coordinates as metadata. Message 1100 may be an RTP header extension as mentioned above. Message 1100 includes a message ID 1105 indicating the metadata contents of the message (e.g., sound source position), a length indicator 1110, an x sound offset coordinate 1115, and a y sound offset coordinate 1120.

Figure 12:
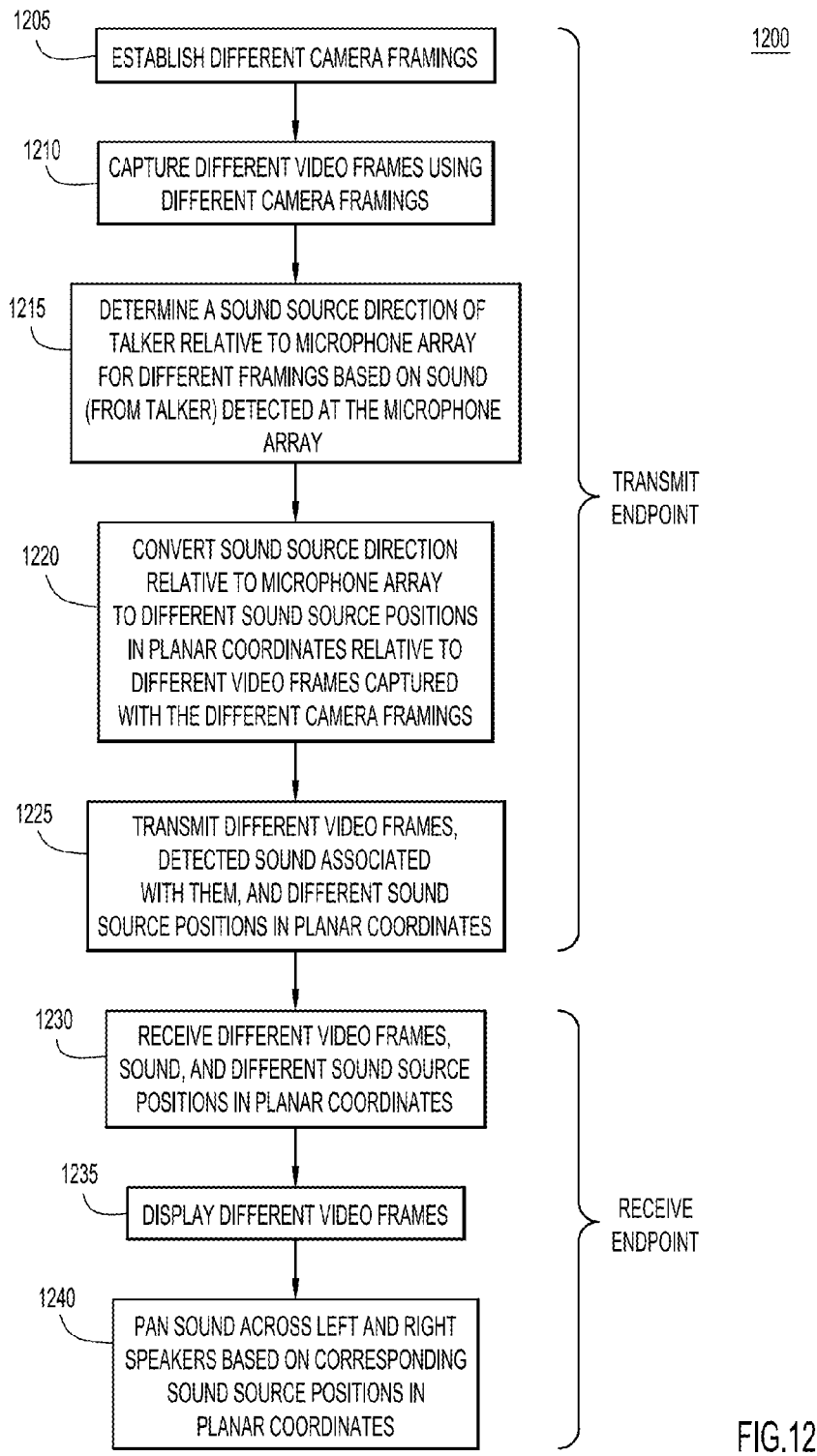
FIG. 12 is a flowchart of an example method of using sound source position information to pan sound.

With reference to FIG. 12, there is a flowchart of an example method 1200 of generating sound source position information that may be used to pan sound as performed at endpoints 104 during a conference session. Method 1200 includes operations that may result from multiple passes through method 300. Method 1200 generates information with which to pan loudspeaker sound relative to different camera framings. It is understood that the different camera framings may include a large number of dynamic, rapidly changing, and unplanned for camera framings that track participant-related dynamics during the conference session. Method 1200 achieves loudspeaker panning that tracks such dynamically changing camera framings in real-time.

Operations 1205-1225 are performed at endpoint 104(1) (the transmit endpoint) and operations 1225-1240 are performed at endpoint 104(2) (the receive endpoint).

At 1205, endpoint 104(1) establishes different camera framings to frame different views of a talker based on different sets of pan, tilt, and focal length settings of the camera, respectively. The different views may include a first view (e.g., a wide-view) and a second view (e.g., a closeup view).

At 1210, endpoint 104(1) captures different video frames of the different views using the different camera framings, respectively. For example, endpoint 104(2) captures a video frame of the first view and a video frame of the second view.

At 1215, endpoint 104(1) determines a sound source direction of the talker relative to microphone array 118 in a fixed 3D global coordinate system for the different views/camera settings based on sound from the talker detected by the microphone array. Assuming a stationary talker, the sound source direction relative to microphone array 118 is the same for the first view/camera setting and the second view/camera setting.

At 1220, endpoint 104(1) converts the sound source direction relative to the microphone array to different sound source positions in planar coordinates relative to the different video frames based on the different sets of pan, tilt, and focal length settings, respectively. For example, endpoint 104(2) generates a first sound source position in planar coordinates for the first view/camera setting and a second sound source position in planar coordinates for the second view/camera setting. To do this, for each camera framing, endpoint 104(1) (i) converts the sound source direction relative to the microphone array to a sound position relative to a camera coordinate system, and (ii) converts the sound position relative to the camera coordinate system to a sound source position in planar coordinates.

At 1225, endpoint 104(1) transmits the different (captured) video frames, the (detected) sound (which may include mono sound), and the different sound source positions in planar coordinates that correspond to each other.

At 1230, endpoint 104(2) receives the different video frames, sound, and the different sound source positions in planar coordinates.

At 1235, endpoint 104(2) displays the different video frames.

At 1240, endpoint 104(2) pans the sound across loudspeakers of a loudspeaker array (e.g., left and right loudspeakers) of the endpoint using the different sound source positions in planar coordinates so that sound played-back by the loudspeakers of the loudspeaker array correlates with a position of the talker in the different video frames as displayed.

Returning again to FIG. 3, at operations 302 and 304, endpoint 104(1) may use any known technique to determine a sound source position based on sound from the sound source as detected at microphone array 118. For example, when microphone array 118 detects sound from a sound source, endpoint 104(1) performs sound signal processing on the detected sound, particularly from different spaced-apart pairs of microphones of microphone array 118, to derive a sound angle of arrival at the microphone array of the sound originating from the sound source. In an embodiment in which microphone array 118 is a planar 2D microphone array, the derived sound angle of arrival encompasses an elevation angle and an azimuth angle. Endpoint 104(1) may also derive a range to the sound source.

In one example, the sound angle of arrival may be derived based on a time difference $\Delta t$ between time-of-arrivals (TOAs) of sound detected at the individual microphones. The sound angle of arrival may be determined based on the following formula: sound angle of arrival=$\arcsin(\Delta t * c/d)$, where: $\Delta t$=the TOA time difference; d=the individual microphone spacing; and c=the speed of sound in air at a given air temperature T. Additionally, controller 1308 also derives the distance between microphone array 118 and the sound source based on a combination of multiple time differences $\Delta t$ derived from the sensed sound from the different microphone pairs.

At operation 312, endpoint 104(1) determines if a sound source position and a detected face position coincide, i.e., match within a predetermined tolerance. A sound source position and face position are determined to coincide with each other if it is determined that their respective ranges/distances match within a predetermined range tolerance and/or if there respective angles of detection match within a predetermined tolerance.

Figure 13:
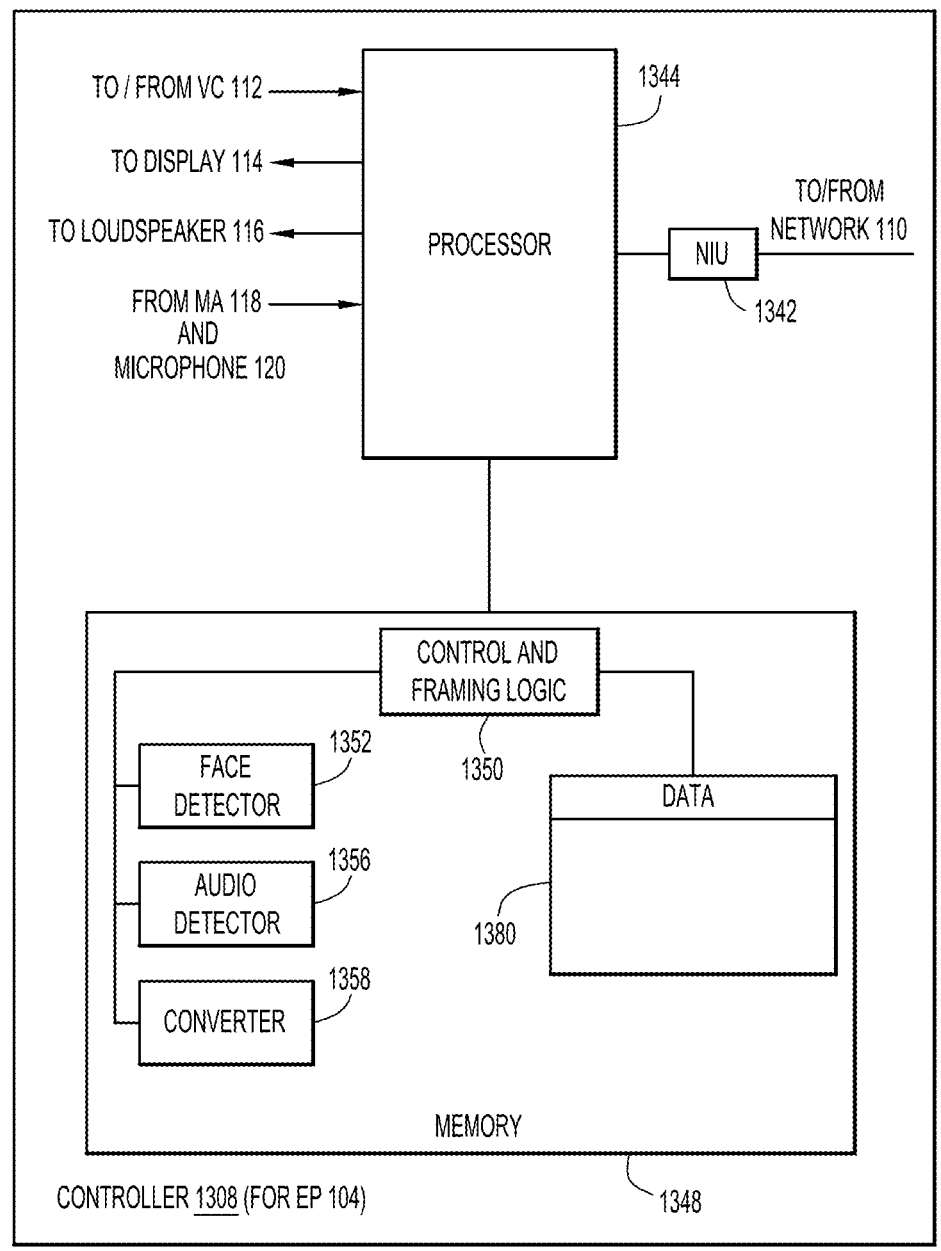
FIG. 13 is block diagram of a controller of a video conference endpoint, according to an example embodiment.

Reference is now made to FIG. 13, which shows an example block diagram of a controller 1308 of any of video conference endpoints 104 configured to perform embodiments described herein. There are numerous possible configurations for controller 1308 and FIG. 13 is meant to be an example. Controller 1308 includes a network interface unit (NIU) 1342, a processor 1344, and memory 1348. NIU 1342 may include wired and/or wireless connection capability. In a wired embodiment, NIU 1342 may include, for example, an Ethernet card or other interface device that includes hardware and/or software having a connection port and that enables device 200 to communicate over a communication network via the connection port. In a wireless embodiment, NIU 1342 includes a wireless transceiver coupled to an antenna to transmit and receive wireless communication signals to and from the network.

Processor 1344 may include a collection of microcontrollers and/or microprocessors, for example, each configured to execute respective software instructions stored in the memory 1348. The collection of microcontrollers may include, for example: a video controller to receive, send, and process video signals related to display 114 and video camera 112; a sound processor to receive, send, and process sound signals related to loudspeakers 116, MA 118, and mono-microphone 120; and a high-level controller to provide overall control. Processor 1344 may send PTZ commands to video camera 112, which is responsive to the commands as would be appreciated by one of ordinary skill in the relevant arts. Portions of memory 1348 (and the instruction therein) may be integrated with processor 1344. In the transmit direction, processor 1344 encodes sound/video captured by MA 118/video camera 112, encodes the captured sound/video into data packets, and causes the encoded data packets, along with metadata as described herein, to be transmitted to communication network 110. In a receive direction, processor 1344 decodes sound/video and metadata from data packets received from communication network 110 and causes the sound/video to be presented to local participants 106 via loudspeakers 116/display 114 based on the metadata. As used herein, the terms "audio" and "sound" are synonymous and interchangeably.

The memory 1348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1348 may comprise one or more computer readable storage media (e.g., a memory device) encoded with software comprising computer executable instructions and when the software is executed (by the processor 1344) it is operable to perform the operations described herein. For example, the memory 1348 stores or is encoded with instructions for Control logic 1350 to perform overall control of endpoint 104 and operations described herein related to sound panning, for example, operations described in connection with the methods of FIGS. 3 and 12. Control logic 1350 includes a Face Detector 1352 to detect faces and face positions based on captured video (i.e., to perform image processing on the captured video to detect faces therein), a Sound Detector 1356 to detect positions of sound sources (e.g., talkers) based on the detected sound, and a positional Converter 1358 to convert positions of sound sources to sound source positions in planar coordinates.

In addition, memory 1348 stores data 1380 used and generated by logic/detectors 1350-1358, including, but not limited to: information associated with detected faces (e.g., positions, confidence levels, stored detected faces, and the like); information associated with detected sound sources (e.g., positions of talkers); sound source positions in various coordinate systems; information about image sensor 602, including spatial dimensions and pixel resolutions; and PTZ setting of camera 112.

In summary, embodiments presented herein send positional information about a current talker at a local video conference endpoint to one or more far-end/remote video conference endpoints, which use the positional information to playback a sound signal that matches the position of the talker in a video stream received from the local video conference endpoint. The positional information may be transmitted as metadata separate from sound and video stream or embedded therein.

The transmit endpoint calculates the position of the sound source in the 2D video, directly and in x/y coordinates, based on information from real-time audio tracking (position tracking) and face detection plus knowledge of a current camera crop chosen by the transmit endpoint. When the crop changes, the position of the sound source in the 2D video changes as well, keeping the relation to the video at all times. This way rendering position can be used directly or calculated easily at the receive endpoint even in complex compound layouts. The same is true for a transcoding and composing Multipoint Control Unit (MCU), with the added advantage of being able to send audio objects directly related to its 2D video frame composition and not having to care about physical 3D rooms at the senders.

In an example, a video conference session is held between location A and B, as describe above. Location A is a meeting room with multiple participants. Location B is a meeting room or any other personal meeting system.

At location A, person1 is speaking. The table (or ceiling microphone) is capturing a mono audio signal. At the same time, the microphone array and associated position detection logic is capturing the position of person1. Further, the metadata is generated containing information about the position of the current talker relative to the framing in the sent video signal. The metadata is sent to the far-end along with the regular audio and video signal.

At location B, the metadata is received along with the audio and video signal. The endpoint at location B uses the positional information in the metadata to place the received mono audio in a stereo audio signal, before playing it through the left and right loudspeakers. In a first framing, the audio is positioned relative to the overview image. In a second framing using the metadata, audio is positioned to match the new placement of the talker in the close up framing. In this situation, the audio will move from right to left in accordance to the framing.

The audio is both adapted to the position of the talker in the video signal, as well as the layout composed far end, and follows changes in the framing from the sending endpoint. For example, using the received video frame as one of several elements in a compound layout, the metadata about audio position can easily be scaled to the new layout by the receiver. For instance, when the receiver is hosting a multisite session, or when the received stream is one out of several in a switched multisite session hosted by a server. The same is true for a composing MCU.

Metadata is related to the 2D video frame sent in a given instant, and can be position x, optionally 2D position (x, y), optionally position and width (x, w). The latter can be useful where there is some uncertainty, or as an extension of the concept to stereo content streams. Metadata should be sent embedded in the audio stream to avoid delays in rendering changes in framing.

In natural communication, audio direction is key to supporting situational understanding, and induces a minimal human mental load. This is something one normally does not think about, but can become an artificial limitation in videoconference meetings, making communication worse compared to actually being present. Distinguishing different talkers can cause mental fatigue. Frequent changes in camera framing and rendering in compound layouts makes things worse.

When frequently changing the camera framing of a scene, it is important that the audio follows the placement of the current talker. Embodiments presented herein use information, obtained through detected audio, about the placement of a current talker in a room relative to a current camera/video framing to create an improved user experience, both when showing overview and closeup framings.

The embodiments advantageously operate without a need for stereo microphones, and without a need to send stereo audio over a network. Also, the embodiments are loudspeaker agnostic. The description above references stereo loudspeakers by way of example, only; sound may be panned across other arrangements of loudspeakers. There is no need for the transmit videoconference endpoint or any middle-box communication device to know anything about the layout of a loudspeaker system and any echo control capabilities of the receiver endpoint. The receiver endpoint is enabled to implement the loudspeaker panning so long as it is aware of the geometry between its loudspeakers and displays. The receiver endpoint can add value for using anything from a video wall with a complex loudspeaker system to a soft client on a laptop rendering audio for headphones. Even an audio-only receiver endpoint may pan different sources for separation. Also, graceful degradation is possible because the receiver endpoint can simply ignore the metadata if not supporting the panning feature.

In summary, in one form, a method is provided comprising: at a video conference endpoint including a microphone array and a camera: establishing different camera framings to frame different views of a talker based on different sets of pan, tilt, and focal length settings of the camera; capturing different video frames of the different views using the different camera framings, respectively; determining a sound source direction of the talker relative to the microphone array in a fixed three-dimensional (3D) global coordinate system for the different views based on sound from the talker detected by the microphone array; converting the sound source direction relative to the microphone array to different sound source positions in planar coordinates relative to the different video frames based on the different sets of pan, tilt, and focal length settings, respectively; and transmitting the different video frames, the sound, and the different sound source positions in planar coordinates.

In another form, an apparatus is provided comprising: a microphone array; a camera; a network interface unit to communicate with a network; and a processor coupled with the microphone array, the camera, and the network interface unit, and configure to: establish different camera framings to frame different views of a talker based on different sets of pan, tilt, and focal length settings of the camera; capture different video frames of the different views using the different camera framings, respectively; determine a sound source direction of the talker relative to the microphone array in a fixed three-dimensional (3D) global coordinate system for the different views based on sound from the talker detected by the microphone array; convert the sound source direction relative to the microphone array to different sound source positions in planar coordinates relative to the different video frames based on the different sets of pan, tilt, and focal length settings, respectively; and transmit the different video frames, the sound, and the different sound source positions in planar coordinates.

In yet another form, a processor readable medium is provided to store instructions that, when executed by a processor, cause the processor to: establish different camera framings to frame different views of a talker based on different sets of pan, tilt, and focal length settings of a camera of a video conference endpoint; capture different video frames of the different views using the different camera framings, respectively; determine a sound source direction of the talker relative to the microphone array in a fixed three-dimensional (3D) global coordinate system for the different views based on sound from the talker detected by a microphone array of the video conference endpoint; convert the sound source direction relative to the microphone array to different sound source positions in planar coordinates relative to the different video frames based on the different sets of pan, tilt, and focal length settings, respectively; and transmit the different video frames, the sound, and the different sound source positions in planar coordinates.

The above description is intended by way of example only. Various modifications and structural changes may be made therein without departing from the scope of the concepts described herein and within the scope and range of equivalents of the claims.

What is claimed is:

1. A method comprising:
   at a video conference endpoint including a microphone array and a camera:
      establishing different camera framings to frame different views of a talker based on different sets of pan, tilt, and focal length settings of the camera;
      capturing different video frames of the different views using the different camera framings, respectively;
      determining a sound source direction of the talker relative to the microphone array in a fixed three-dimensional (3D) global coordinate system for the different views based on sound from the talker detected by the microphone array;
      converting the sound source direction relative to the microphone array to different sound source positions in planar coordinates relative to the different video frames based on the different sets of pan, tilt, and focal length settings, respectively; and
      transmitting the different video frames, the sound, and the different sound source positions in planar coordinates.

2. The method of claim 1, wherein each sound source position in planar coordinates respectively includes a first planar coordinate that represents a fraction of a width of a corresponding one of the different video frames and a second planar coordinate that represents a fraction of a height of the corresponding one of the different video frames.

3. The method of claim 1, wherein the converting includes, for each camera framing:
   first converting the sound source direction to a sound source position relative to a 3D camera coordinate system that rotates in accordance with the pan and the tilt settings of the camera for that camera framing; and
   second converting the sound source position relative to the 3D camera coordinate system to the sound source position in planar coordinates relative to the video frame for that camera framing.

4. The method of claim 3, wherein the 3D global coordinate system and the 3D camera coordinate system each represents a 3D polar coordinate system.

5. The method of claim 3, wherein the second converting includes for each camera framing:
   converting the sound source position relative to the 3D camera coordinate system to a sound source position in sensor coordinates relative to a planar image sensor of the camera; and
   converting, based on a pixel resolution and planar dimensions of the image sensor, the sensor coordinates to the planar coordinates of the sound source position relative to the corresponding video frame, such that the planar coordinates of the sound source position relative to the corresponding video frame represent respective fractions of spatial dimensions of the corresponding video frame.

6. The method of claim 1, further comprising: at a remote video conference endpoint:
receiving the different video frames, the sound, and the different sound source positions in planar coordinates transmitted by the video conference endpoint;
displaying the different video frames; and
panning the sound across loudspeakers of a loudspeaker array of the remote video conference endpoint using the different sound source positions in planar coordinates so that sound transmitted by the loudspeakers of the loudspeaker array correlates with a position of the talker in the different video frames as displayed.

7. The method of claim 1, wherein the transmitting includes transmitting:
a sound stream including the sound; and
metadata including the sound source position in planar coordinates embedded in the sound stream.

8. The method of claim 1 wherein the pan, tilt, and focal length settings are implemented digitally using a digital zoom in the camera.

9. An apparatus comprising:
a microphone array;
a camera;
a network interface unit to communicate with a network; and
a processor coupled to the microphone array, the camera, and the network interface unit, and configure to:
establish different camera framings to frame different views of a talker based on different sets of pan, tilt, and focal length settings of the camera;
capture different video frames of the different views using the different camera framings, respectively;
determine a sound source direction of the talker relative to the microphone array in a fixed three-dimensional (3D) global coordinate system for the different views based on sound from the talker detected by the microphone array;
convert the sound source direction relative to the microphone array to different sound source positions in planar coordinates relative to the different video frames based on the different sets of pan, tilt, and focal length settings, respectively; and
transmit the different video frames, the sound, and the different sound source positions in planar coordinates.

10. The apparatus of claim 9, wherein each sound source position in planar coordinates respectively includes a first planar coordinate that represents a fraction of a width of a corresponding one of the different video frames and a second planar coordinate that represents a fraction of a height of the corresponding one of the different video frames.

11. The apparatus of claim 9, wherein the processor is configure to convert by, for each camera framing:
first converting the sound source direction to a sound source position relative to a 3D camera coordinate system that rotates in accordance with the pan and the tilt settings of the camera for that camera framing; and
second converting the sound source position relative to the 3D camera coordinate system to the sound source position in planar coordinates relative to the video frame for that camera framing.

12. The apparatus of claim 11, wherein the 3D global coordinate system and the 3D camera coordinate system each represents a 3D polar coordinate system.

13. The apparatus of claim 11, wherein the processor is configured to perform the second converting by, for each camera framing:
converting the sound source position relative to the 3D camera coordinate system to a sound source position in sensor coordinates relative to a planar image sensor of the camera; and
converting, based on a pixel resolution and planar dimensions of the image sensor, the sensor coordinates to the planar coordinates of the sound source position relative to the corresponding video frame, such that the planar coordinates of the sound source position relative to the corresponding video frame represent respective fractions of spatial dimensions of the corresponding video frame.

14. The apparatus of claim 9, wherein the processor is configured to transmit by transmitting:
a sound stream including the sound; and
metadata including the sound position in planar coordinates embedded in the sound stream.

15. A non-transitory processor readable medium storing instructions that, when executed by a processor, cause the processor to:
establish different camera framings to frame different views of a talker based on different sets of pan, tilt, and focal length settings of a camera of a video conference endpoint;
capture different video frames of the different views using the different camera framings, respectively;
determine a sound source direction of the talker relative to a microphone array in a fixed three-dimensional (3D) global coordinate system for the different views based on sound from the talker detected by the microphone array of the video conference endpoint;
convert the sound source direction relative to the microphone array to different sound source positions in planar coordinates relative to the different video frames based on the different sets of pan, tilt, and focal length settings, respectively; and
transmit the different video frames, the sound, and the different sound source positions in planar coordinates.

16. The processor readable medium of claim 15, wherein each sound source position in planar coordinates respectively includes a first planar coordinate that represents a fraction of a width of a corresponding one of the different video frames and a second planar coordinate that represents a fraction of a height of the corresponding one of the different video frames.

17. The processor readable medium of claim 15, wherein the instructions to cause the processor to convert include instructions to cause the processor to, for each camera framing:
first convert the sound source direction to a sound source position relative to a 3D camera coordinate system that rotates in accordance with the pan and the tilt settings of the camera for that camera framing; and
second convert the sound source position relative to the 3D camera coordinate system to the sound source position in planar coordinates relative to the video frame for that camera framing.

18. The processor readable medium of claim 17, wherein the 3D global coordinate system and the 3D camera coordinate system each represents a 3D polar coordinate system.

19. The processor readable medium of claim 17, wherein the instructions to cause the processor to second convert include instructions to cause the processor to, for each camera framing:
- convert the sound source position relative to the 3D camera coordinate system to a sound source position in sensor coordinates relative to a planar image sensor of the camera; and
- convert, based on a pixel resolution and planar dimensions of the image sensor, the sensor coordinates to the planar coordinates of the sound source position relative to the corresponding video frame, such that the planar coordinates of the sound source position relative to the corresponding video frame represent respective fractions of spatial dimensions of the corresponding video frame.

20. The processor readable medium of claim 15, wherein the instructions to cause the processor to transmit include instructions to cause the transmitter to transmit:
- a sound stream including the sound; and
- metadata including the sound position in planar coordinates embedded in the sound stream.

\* \* \* \* \*